United States Patent
Kister

(10) Patent No.: US 7,513,184 B2
(45) Date of Patent: Apr. 7, 2009

(54) COMPOSITE STRUCTURAL PART COMPRISING PYROTECHNIC DETONATING RUPTURE MEANS

(75) Inventor: Thomas Kister, Meulan (FR)

(73) Assignee: Eads Space Transportation SAS, Paris (FR)

( * ) Notice: Subject to any disclaimer, the term of this patent is extended or adjusted under 35 U.S.C. 154(b) by 553 days.

(21) Appl. No.: 10/551,960

(22) PCT Filed: Oct. 11, 2004

(86) PCT No.: PCT/FR2004/002563

§ 371 (c)(1),
(2), (4) Date: Oct. 6, 2005

(87) PCT Pub. No.: WO2005/047810

PCT Pub. Date: May 26, 2005

(65) Prior Publication Data

US 2006/0201316 A1  Sep. 14, 2006

(30) Foreign Application Priority Data

Nov. 5, 2003   (FR) .................................. 03 12981

(51) Int. Cl.
   *B64D 1/04*   (2006.01)
(52) U.S. Cl. ...................... 89/1.57; 89/1.14; 244/137.4; 137/68.13; 83/639.4
(58) Field of Classification Search ................... 89/1.57, 89/1.14; 244/137.4; 137/68.13; 83/639.4
See application file for complete search history.

(56) References Cited

U.S. PATENT DOCUMENTS

| 5,109,749 | A | 5/1992 | Olcer |
| 5,129,306 | A | 7/1992 | Fauvel |
| 6,629,486 | B2 * | 10/2003 | Forys et al. ................... 89/1.14 |
| 7,127,994 | B2 * | 10/2006 | Cleveland ................... 102/378 |
| 7,261,038 | B2 * | 8/2007 | Cleveland ................... 102/378 |

FOREIGN PATENT DOCUMENTS

| FR | 2638228 | 4/1990 |
| FR | 2665951 | 2/1992 |

OTHER PUBLICATIONS

PCT International Search Report dated Sep. 2, 2005.

* cited by examiner

*Primary Examiner*—J. Woodrow Eldred
(74) *Attorney, Agent, or Firm*—Dickinson Wright, PLLC

(57) ABSTRACT

A pyrotechnically-ruptureable composite structural component, intended to transmit forces between first and second structural elements, has an elongate pyrotechnic detonation separation component incorporated in the structural component for breaking the structural component and separating the first and second elements. The structural component has a first part in which the pyrotechnic separation component is incorporated and which is able to be connected to the first element, and a second part that connects to the second element. The first and second parts are rigidly assembled via their free ends, which are the opposite ends to the first and second elements respectively. The rigid assembly has a damper arranged between the free ends of the first and second elements so as to damp a detonation shock propagating to the free end of the first part when the pyrotechnic separation component is detonated.

10 Claims, 2 Drawing Sheets

COMPOSITE STRUCTURAL PART COMPRISING PYROTECHNIC DETONATING RUPTURE MEANS

FIELD OF THE INVENTION

The present invention relates to a pyrotechnic detonating ruptureable composite structural component quite particularly, although not exclusively, suited for use in space launchers. It will be described hereinafter more particularly in the latter application.

BACKGROUND OF THE RELATED ART

It is known that certain elements of space launchers, such as adjacent stages, are mechanically joined together by a composite structural component intended to transmit mechanical forces between said elements as necessary and provided with pyrotechnic detonation separation means incorporated in said structural component and able to break it along the straight or curved line of separation when said elements have to be separated from one another. Similar composite structural components also allow the satellite bearing structures to be severed on board launchers.

At the moment of rupture of such a structural component, that is to say at the moment of separation of the structural elements it secures, said pyrotechnic separation means generate a detonation shock of high amplitude, high frequency, and with a high propagation speed (several kilometers per second), propagating through the structure to which said elements belong, the amplitude and the frequency of said shock diminishing as it propagates through the structure.

Hence, in order to protect the equipment and the payload which are contained in said structural elements, it is common practice to provide a plurality of discrete damping means, generally sheets or strips of visco-elastic material, near said equipment and near the payload, so as to attenuate the shock, the amplitude and frequency of which have already been diminished by the propagation.

It will be noted that the arrangement of such a plurality of discrete attenuation means increases the complexity and the time taken to mount said equipment and the payload in the launcher.

SUMMARY OF THE INVENTION

It is the main object of the present invention to remedy this disadvantage.

To this end, according to the invention, the pyrotechnically ruptureable composite structural component:
  intended to transmit forces between a first and a second structural element; and
  provided with elongate pyrotechnic detonation separation means incorporated in said structural component and able to break it so that said first element can be separated from said second element along a line of separation, is notable:
  in that it comprises:
    a first part in which said pyrotechnic separation means are incorporated and which is able to be connected to said first element;
    a second part able to be connected to said second element; and
    means of rigid assembly of said first and second parts via their free ends which are the opposite ends to said first and second elements respectively; and
  in that said assembly means comprise damping means:
    arranged between the free ends of said first and second elements; and
    able to damp the detonation shock propagating to the free end of said first part when said pyrotechnic separation means are detonated.

Thus, according to the invention, said damping means are incorporated into said composite structural component, just as are said pyrotechnic separation means. As a result, the detonating shock is damped at source and there is no longer any need to position a plurality of dampers near the equipment and near the payload. In addition, the effectiveness of the damping means is high because the amplitude of the shock has not yet been diminished when the shock reaches said damping means.

It will also be noted that, from an industrial standpoint, the present invention is advantageous because it makes it possible to obtain a single composite component incorporating the pyrotechnic separation means and the means of damping the detonation shock.

As a preference, said assembly means form a chamber enclosing said free ends of said first and second parts and confining said damping means between said free ends. Such a chamber may be formed by lateral plates arranged on each side of said free ends and secured only to said second part.

Thus, said damping means not only damp the detonation shock but also stiffen the means of assembly between said first and second parts of said composite structural component. They therefore simultaneously form a barrier to the detonation waves and a mechanical connection between said first and second parts.

To this end, it is advantageous for said damping means to extend laterally between said lateral plates and said free end of said first part and to be confined there and for the free end of said first part to comprise a widened head.

Thus, said damping means may have a cross section in at least the approximate shape of a stylized omega, the internal cavity of which is filled by said widened head. The result of this shape is that, regardless of the direction and nature of the forces applied to said assembly means, these means cause at least part of said damping means to be compressed. The stiffness of said assembly means therefore depends primarily on the compressibility of the material of which said damping means are made. Such a material may be of the visco-elastic type and be chosen, for example, from among natural rubbers, silicones, acrylonitrile butadienes or polyurethanes.

For reasons of convenience, it is preferable for said damping means to be in the form of an open section placed over the free end of said first part to enclose it.

It is advantageous for the surface of said damping means in contact with the free end of said first part to comprise cavities allowing the material of said damping means to expand even when these means are subjected to weak mechanical stresses. In the case of strong stresses, as the cavities are immediately filled by said damping means, the material of these means is made to work in volumetric compressibility. Said cavities are therefore able, to a certain extent, to adapt the stiffness of said damping means according to the level of mechanical stress.

BRIEF DESCRIPTION OF THE DRAWINGS

The figures of the attached drawing will make it easy to understand how the invention may be embodied. In these figures, identical references denote similar elements.

DETAILED DESCRIPTION OF THE INVENTION

Figure 1:
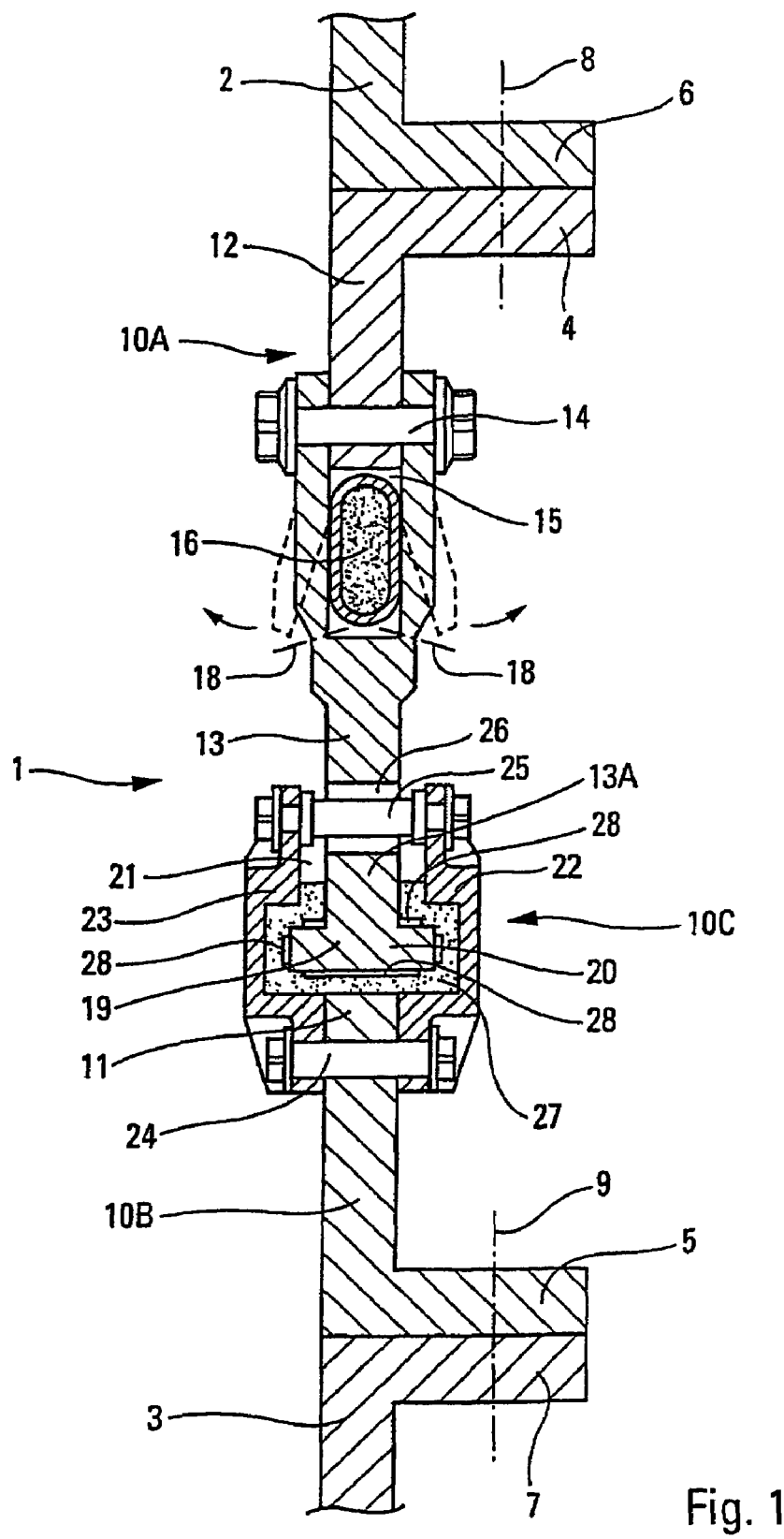
FIG. 1 illustrates, in cross section, one exemplary embodiment of the pyrotechnically ruptureable composite structural component according to the present invention.
Figure 2:
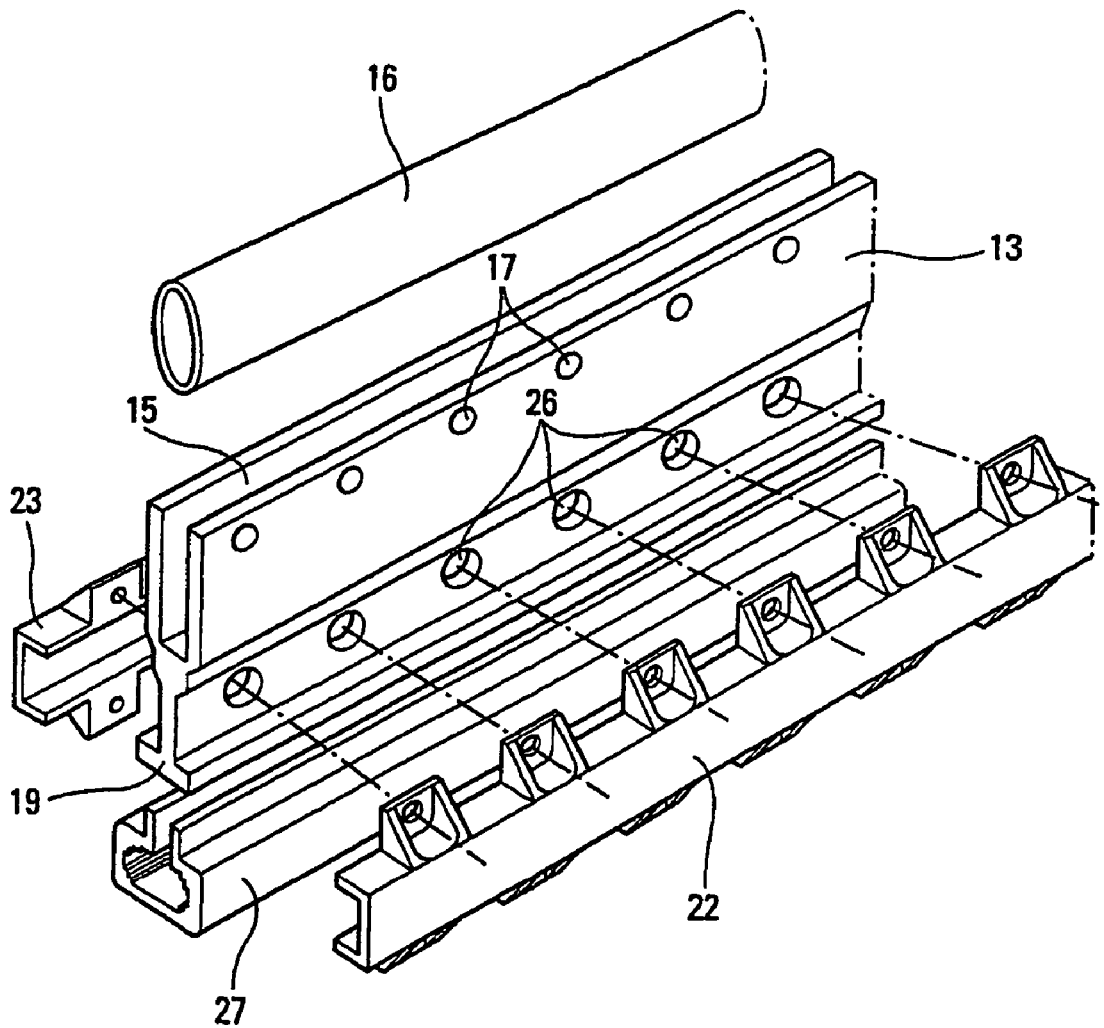
FIG. 2 is an exploded perspective view showing certain constituent parts of the structural component depicted by way of example in FIG. 1.

The pyrotechnically ruptureable composite structural component 1 shown by way of example in FIG. 1 secures elements 2 and 3 of a mechanical structure (not otherwise depicted) between which it is located. For this purpose, the structural component 1, for example made of light alloy, is provided at its ends with flanges 4 and 5 able to collaborate, respectively, with a flange 6 of the element 2 and with a flange 7 of the element 3 and clamping means 8 and 9 (depicted only by way of their axes in FIG. 1) securing the flanges 4 and 6 and the flanges 5 and 7, respectively.

The structural component 1 consists of a first part 10A, of a second part 10B and of means 10C of assembling said first and second parts.

The second part 10B bears the flange 5 and is therefore connected to the element 3. At the opposite end to the flange 5, the second part 10B has a free end 11, facing toward the first part 10A.

For its part, the first part 10A comprises two elements 12 and 13 fixed together by fixing means 14. At the opposite end to the element 13, the element 12 bears the flange 4.

Facing the element 12, the element 13 has an open housing 15 in which a detonating pyrotechnic cord 16 is housed and which the element 12 enters, closing off said housing 15. The fixing means 14 pass through the walls of the housing 15 (via holes 17) and the part of the element 12 located therein, so as to secure the elements 12 and 13.

In the region of the housing 15, the element 13 has at least one region 18 of preferential rupture.

At its free end 19, the opposite end to the housing 15 and to the element 12, the element 13 has a widened head 20, for example with a rectangular cross section.

The free ends 11 and 19 facing each other belonging to the parts 10B and 10A are housed in a chamber 21 formed by said assembly means 10C. These means comprise two plates 22, 23 arranged on each side of the second part 10B and of the element 13 to delimit said chamber 21. At one end, the plates 22 and 23 are assembled rigidly with one another and with the second part 10B by clamping means 24 that pass all the way through them. At the other end, the plates 22 and 23 are assembled rigidly with one another by clamping means 25 which pass freely through the element 13 via wide openings 26.

The free end 19 of the element 13 is enclosed by an open section 27, with an at least approximately omega-shaped cross section, made of a visco-elastic material such as a natural rubber, a silicone, an acrylonitrile butadiene or a polyurethane. The section 27 covers not only the widened head 20 of the free end 19 but also the part 13A of the element 13 adjacent to said widened head 20 and forming part of said free end 19. Thanks to the clamping means 24 and 25, the plates 22 and 23 press said section 27 against the free end 11 of the part 10B, on the one hand, and against the part 13A and the widened head 20 of the element 13, on the other hand.

Thus there are confined portions of the section 27 between the free ends of 11 and 19 and between said free end 19 and the plates 22 and 23.

It will therefore be readily understood that the stiffness of the assembly means 10C depends essentially on that of the material of which the section 27 is made and, in particular, on the compressibility of this material. It will in fact be noted that, whatever the direction and nature (compression, elongation, bending, torsion, etc.) of the forces applied to the assembly means 10C, these means cause part of the section 27 to be compressed:

either between the free ends 11 and 19;

or between the widened head 20 and the plates 22 and 23;

or alternatively still, between the part 13A and the plates 22 and 23.

As mentioned hereinabove, in order at least roughly to tune the stiffness of the section 27 to the magnitude of the forces applies to the assembly means 10C, the external surface thereof, which is in contact with the widened head 20, has cavities 28 allowing the constituent material of said section 27 to expand.

When the element 2 has to be separated from the element 3, the pyrotechnic detonating cord 16 is initiated, so that the element 13 is broken at the rupture regions 18, as illustrated schematically in FIG. 1. The detonation shock generated by activation of the pyrotechnic cord 16 is propagated as far as the free end 19 of the element 13 but is prevented, if not completely at least in the main, from being propagated to the part 10B by the section 27 which isolates the latter part from said element.

The invention claimed is:

1. A pyrotechnically ruptureable composite structural component intended to transmit forces between a first and a second structural element and provided with elongate pyrotechnic detonation separation means incorporated in said structural component and able to break it so that said first element can be separated from said second element along a line of separation, said structural component comprising:

a first part in which said pyrotechnic separation means are incorporated and which is able to be connected to said first element;

a second part able to be connected to said second element; and means of rigid assembly of said first and second parts via their free ends which are the opposite ends to said first and second elements respectively;

said assembly means comprising damping means arranged between the free ends of said first and second elements and able to damp the detonation shock propagating to the free end of said first part when said pyrotechnic separation means are detonated.

2. The structural component as claimed in claim 1, wherein said assembly means form a chamber enclosing said free ends of said first and second parts and confining said damping means between said free ends.

3. The structural component as claimed in claim 2, wherein said chamber is formed by lateral plates arranged on each side of said free ends and secured only to said second part.

4. The structural component as claimed in claim 3, wherein said damping means extend laterally between said lateral plates and said free end of said first part and are confined there.

5. The structural component as claimed in claim 1, wherein the free end of said first part comprises a widened head.

6. The structural component as claimed in claim 5, wherein said damping means have a cross section in at least the approximate shape of a stylized omega, the internal cavity of which is filled by said widened head.

7. The structural component as claimed in claim 1, wherein said damping means are in the form of an open section placed over the free end of said first part to enclose it.

8. The structural component as claimed in claim 1, wherein the surface of said damping means in contact with the free end of said first part comprises cavities allowing the constituent material of said damping means to expand when said assembly are subjected to mechanical stresses.

9. The structural component as claimed in claim 1, wherein said damping means are of visco elastic type.

10. The structural component as claimed in claim 9, wherein said damping means are made of a material chosen from materials in the group comprising natural rubbers, silicones, acrylonitrile butadienes or polyurethanes.

\* \* \* \* \*